R. B. Burchell,
Lock.
No. 2,420. Reissued Dec. 18, 1866.
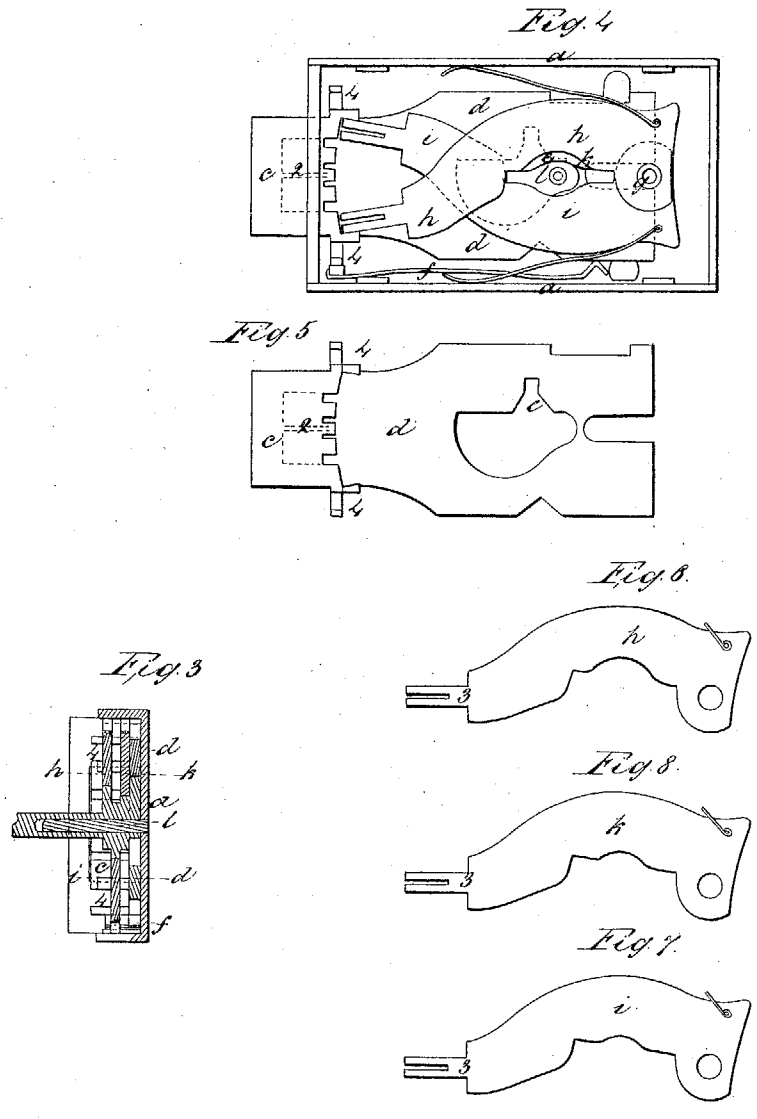
Witnesses
Chas H Smith
Geo Walker
Inventor
R. B. Burchell
per L. W. Serrell
Atty
AM. PHOTO-LITHO. CO. N.Y. (OSBORNE'S PROCESS.)

United States Patent Office.

IMPROVEMENT IN LOCKS.

RICHARD B. BURCHELL, OF BROOKLYN, NEW YORK.

*Letters Patent No.* 57,857, *dated September* 11, 1866; *reissue No.* 2,420, *dated December* 8, 1866.

The Schedule referred to in these Letters Patent and making part of the same.

TO ALL WHOM IT MAY CONCERN:

Be it known that I, RICHARD B. BURCHELL, of Brooklyn, (E. D.,) in the county of Kings, and State of New York, have invented and made a certain new and useful Improvement in Locks; and I do hereby declare the following to be a full, clear, and exact description of the said invention, reference being had to the annexed drawing, making part of this specification, wherein—

Figure 1 is an elevation of my lock, with the bolts retracted, and all the tumblers above the key stud.

Figure 2 is a similar view, with the cap plate removed, and some of the tumblers reversed to stand below the key; and Figure 3 is a section through the key and tumblers.

Figure 4 is a view similar to fig. 2, with the bolt projected.

Similar marks of reference denote the same parts.

The nature of my said invention consists in an arrangement of reversible tumblers, in which the tumbler stud and the key stud are placed upon the line of a plane passing through the centre of the bolt, and the ends of the tumblers take against the inner end of the bolt when projected. By this arrangement and construction I am enabled to obtain from the same tumblers a variety of combinations or permutations by reversing the tumblers, and bringing some above and others below the key stud, or all on one side or the other of the key stud; hence the lock can be varied so as to require a very different key, in case the one usually employed may have been lost or stolen. By the ends of the tumblers taking against the end of the bolt head, when it is projected, the tumblers can be as long as possible within the given size of case, and the ends of the tumblers are raised either above or below the bolt head, or pass into the hollow bolt head as the bolt is retracted.

In the drawing, *a* is the case of the lock, of any desired size or shape; *b* is the cap plate, (removed in fig. 2;) and *c* is the bolt head, and *d* the shank or plate of the bolt, with the locking and unlocking talon, *e*, as usual; *f* is a spring, with an inclined end entering a notch in the plate *d*, to prevent the bolt flying out accidentally when unlocked. The bolt is shown separately in fig. 5. The tumblers, *h i* and *k*, are set to move on the stud, *g*, that is on a central line or a plane running through the centre of the bolt and the key stud *l*, and the ends of the tumblers, *h i k*, taking the inner side of the bolt head, when projected, prevent the bolt being retracted until the ends of the tumblers are properly placed by the action of the key bits. The tumblers, *h i* and *k*, are shown separately in figs. 6, 7, and 8. I have shown the bolt head as hollow, with a stud, 2, entering slots 3 in the ends of the tumblers as the said hollow bolt head is drawn back over the said ends of the tumblers; but the shape of the ends of the tumblers may be such that they will, by the action of the key, be brought above or below the bolt head, and the notches at 4 4 pass back over the tumblers as the bolt is withdrawn. This improved lock is shown as applied to a bolt acted upon directly by the key. The tumblers and their action will, however, be the same if used in connection with a spring latch drawn back by the bolt within the case, against which the key acts. The tumblers may be placed all on one side of the key stud or all on the other, or some may be one side and others the other. In either instance the key is to be made with bits on one or the other sides, so as to bring the tumblers to the proper position for withdrawing the bolt. This allows for great variation in the keys without altering the construction of any part of the lock. When the bolt is retracted, the inner side of the bolt head comes further back within the lock case than the ends of the tumblers; hence the case of the lock can be smaller, in proportion to the length of the tumblers. This character of lock may be furnished with several different keys, and the tumblers be changed periodically in their positions, so as to increase the security against false keys being made and used.

What I claim, and desire to secure by Letters Patent, is—

1. The fixed tumbler stud *g* and key stud *l* arranged on the line of a plane passing through the centre of the bolt head, in combination with tumblers of unequal shape and dimensions, but so constructed that they can be applied on either side of the key stud, and be equally operative with a key of different shape or dimension, substantially as set forth.

2. I claim constructing the head of the bolt as described, and arranging a series of swinging tumblers to operate in conjunction therewith, substantially as set forth.

3. I claim the tumblers, *h i k*, constructed and applied substantially as specified, in combination with the key stud *l* and bolt head *c*, constructed and arranged in the manner and for the purposes set forth.

Dated October 19th, 1866.

RICH'D B. BURCHELL.

Witnesses:

CHAS. H. SMITH,

GEO. D. WALKER.